United States Patent
Ishikawa et al.

[15] 3,658,625
[45] Apr. 25, 1972

[54] APPARATUS FOR CONTINUOUSLY MAKING A HOSE

[72] Inventors: Hajime Ishikawa, 5-25, 2-chome, Wakakusa-cho, Nishinomiya-shi; Youichi Akedo, 1-6, Shariji-cho, Ikuno-ku, Osaka-shi, Osaka-fu; Toshio Kominami, 5-22, 2-chome, Higashinaruocho, Nishinomiya-shi, all of Japan

[22] Filed: Jan. 26, 1970

[21] Appl. No.: 5,482

[30] Foreign Application Priority Data

Feb. 4, 1969 Japan....................................44/9834

[52] U.S. Cl............................................156/429, 156/195
[51] Int. Cl.........................................................B65h 81/00
[58] Field of Search..............156/429, 195, 436; 140/92.3, 140/92.93

[56] References Cited

UNITED STATES PATENTS

| 3,336,172 | 8/1967 | Hall et al............................156/429 X |
| 2,398,876 | 4/1946 | Bailey................................156/195 X |

FOREIGN PATENTS OR APPLICATIONS

| 1,114,657 | 5/1968 | Great Britain.........................156/195 |
| 539,466 | 9/1941 | Great Britain.........................156/195 |

*Primary Examiner*—Benjamin A. Borchelt
*Assistant Examiner*—G. E. Montone
*Attorney*—Wenderoth, Lind & Ponack

[57] ABSTRACT

An apparatus for continuously making a hose which is easy and economical to construct because use is made of cantilever type shaping rolls having no guide means such as spiral grooves or the like formed thereon, and a pressing roll provided with an enlarged annular portion having a sloped tape guiding surface formed at the rear end of the pressing roll, whereby a continuous hose can be produced very smoothly.

2 Claims, 4 Drawing Figures

HAJIME ISHIKAWA
YOUICHI AKEDO
TOSHIO KOMINAMI

INVENTORS

HAJIME ISHIKAWA
YOUICHI AKEDO
TOSHIO KOMINAMI

INVENTORS

APPARATUS FOR CONTINUOUSLY MAKING A HOSE

BACKGROUND OF THE INVENTION

1. Field of the Invention

This invention relates to an apparatus for continuously making a hose, and more particularly to improvements in or relating to such an apparatus.

2. Description of the Prior Art

There has heretofore been known an apparatus for making hoses which uses pressing and shaping rolls having their outer walls formed with spiral grooves or like means so that material such as soft synthetic resin extruded from an extruder may be spirally guided around the shaping rolls. The formation of such guide means on the walls of the pressing and shaping rolls is cumbersome and expensive, and accordingly this leads to a high cost of the entire apparatus.

SUMMARY OF THE INVENTION

It is an object of the present invention to provide an apparatus for continuously making a hose which comprises a plurality of cantilever type shaping rolls disposed so as to form an imaginary cylindrical surface and driven for rotation at an equal velocity in the same direction, said shaping rolls being adapted to carry thereon a soft synthetic resin tape, or a soft synthetic resin tape enclosing a harder synthetic resin core and having tacky edges in such a manner that the tape is spirally entrained on said shaping rolls and moved forward from the rear end to the fore end of the rolls, and a pressing roll disposed outwardly of and in opposed relationship with one of said shaping rolls, said pressing roll pressing said spirally moving tape so as to join the adjacent edges thereof with each other in succession to thereby form the tape into an integral hose which is discharged out of said fore end of said shaping rolls, said pressing roll being provided with an enlarged annular portion formed at the rear end thereof, said enlarged annular portion having a sloped tape guiding surface extending therefrom to merge with the peripheral surface of said pressing roll.

According to this embodiment, a tape supplied between the pressing roll and the shaping rolls can be spirally guided toward the fore end of the rolls whereby the hose shaping process can be carried out very smoothly.

It is another object of the present invention to provide an apparatus for continuously making a hose which comprises a plurality of cantilever type shaping rolls disposed so as to form an imaginary cylindrical surface and driven for rotation at an equal velocity in the same direction, said shaping rolls being adapted to carry thereon a soft synthetic resin tape, or a soft synthetic resin tape enclosing a harder synthetic resin core and having tacky edges in such a manner that the tape is spirally entrained on said shaping rolls and moved forward from the rear end to the fore end of the rolls, and a pressing roll disposed outwardly of and in opposed relationship with one of said shaping rolls, said pressing roll pressing said spirally moving tape so as to join the adjacent edges thereof with each other in succession to thereby form the tape into an integral hose which is discharged out of said fore end of said shaping rolls, said shaping rolls being provided with enlarged portions formed at the rear end thereof, said enlarged portions forming stepped portions extending toward said fore end of the shaping rolls and for pressing the tape edges, the axial length of each stepped portion being increased in the direction of the spiral movement of the tape by a dimension corresponding to the result obtained by dividing the width of the tape by the number of the shaping rolls.

According to this latter embodiment, a tape supplied between the pressing roll and the shaping rolls can be spirally guided toward the fore end of the rolls by the special formation of the stepped portions, whereby the tape or the hose resulting therefrom can be guided very smoothly out of the apparatus without the provision of any special guide means such as sloped grooves in the opposed pressing and shaping rolls and each of these rolls may have a smooth wall surface which is easy and economical to form.

BRIEF DESCRIPTION OF THE DRAWINGS

The present invention will now be described in greater detail with respect to the preferred embodiments thereof as shown in the accompanying drawings, in which.

DESCRIPTION OF THE PREFERRED EMBODIMENTS

Figure 1:
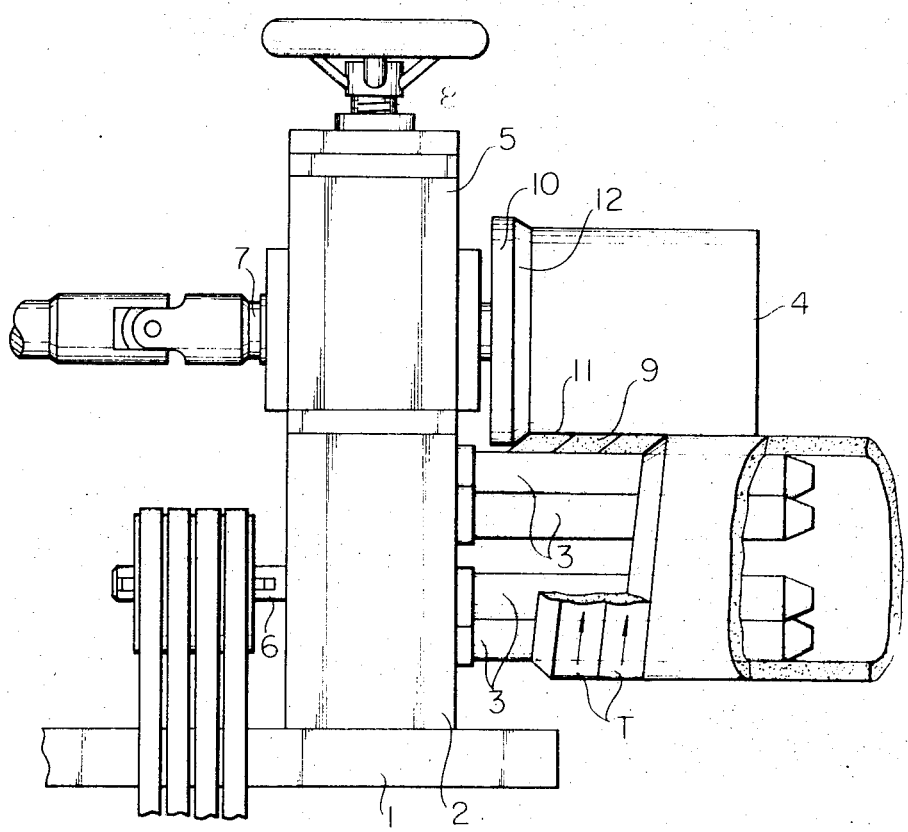
FIG. 1 is a partly cross-sectional side view of the apparatus for continuously making a hose according to an embodiment of the present invention, in which a portion of the tape is shown in cross section.
Figure 2:
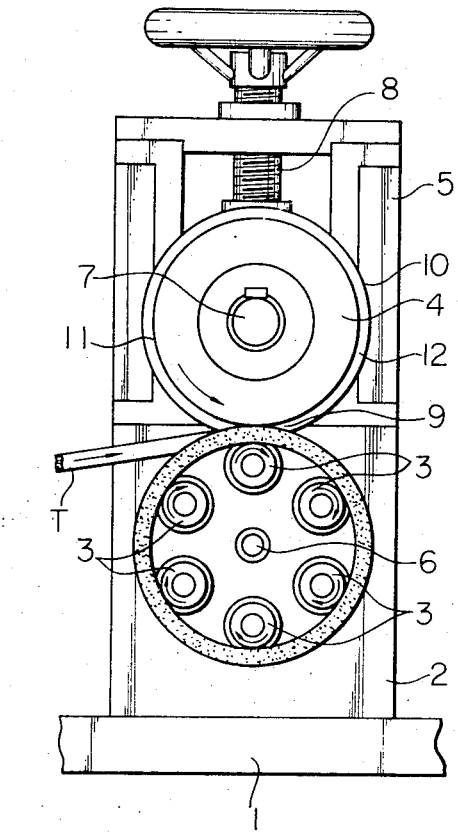
FIG. 2 is a front view of the apparatus of FIG. 1.

Referring now to FIGS. 1 and 2, the apparatus according to an embodiment of the present invention comprises a base 1, a housing 2, and a plurality of shaping rolls 3 disposed equidistantly along the periphery of a common circle and mounted on the front face of the housing 2 in cantilever fashion. In the shown example, the shaping rolls 3 consist of six such rolls, but the number of these rolls is not limited thereto. A main driving shaft 6 extends through the housing 2 which houses therein a gearing mechanism associated with the main driving shaft 6 so as to drive the rolls 3 at an equal velocity in the same direction. A pressing roll 4 driven for rotation by a shaft 7 is disposed in overlying relationship with said plurality of shaping rolls 3. The shaft 7 is vertically moved within a support frame 5 by manually rotating a one of operable threaded rod 8 so as to adjust a gap 9 between the pressing roll 4 and the uppermost of the shaping rolls 3.

An annular enlarged portion 10 is provided at the rear end of the pressing roll 4, and the annular enlarged portion 10 has a downwardly sloped surface 12 formed to extend therefrom to merge with the periphery 11 of the pressing roll 4.

In operation, a soft tape of vinyl chloride, or a soft tape of vinyl chloride enclosing a harder synthetic resin core extruded from an extruder is entrained onto the enlarged annular portion 10 which serves as a tape or feed port, as shown by the arrow in FIG. 2. The tape T is then guided along the sloped surface 12 so that it is passed into the gap 9 between the pressing roll 4 and the uppermost shaping roll 3 so as to be entrained on the successive shaping rolls 3 at a certain angle inclined toward the fore end of these rolls, as shown in FIG. 1. The tape T is driven by the rotating rolls 3 and 4 to make a full rotation around the circle formed by the group of circularly disposed shaping rolls 3 while it is moved forward a distance corresponding to a pitch of the turn. In this way the tape T is continuously driven to move spirally and forward while rotating around the shaping rolls 3, as shown by the arrows in FIG. 1. During the time the tape T is moving spirally and forwardly, the threaded shaft 8 may be manually operated to suitably adjust the gap 9 between the rolls 3 and 4, so that suitable balance is obtained between the resistance which is encountered by the spirally moving tape T and the speed at which the tape T is fed. This causes the spirally moving tape T to have its adjacent edges joined together due to the tackiness of the tape material and to the compression provided by the cooperation between the pressing roll 4 and the shaping rolls 3, and thus there is formed a continuous, integral hose.

From the foregoing discussion it will be appreciated that the apparatus according to this embodiment requires no special guide means such as sloped grooves to be formed in the pressing and shaping rolls, and this leads to the smooth surface of each roll which is easy and economical to form, and consequently leads to the simplification of the entire apparatus.

Figure 4:
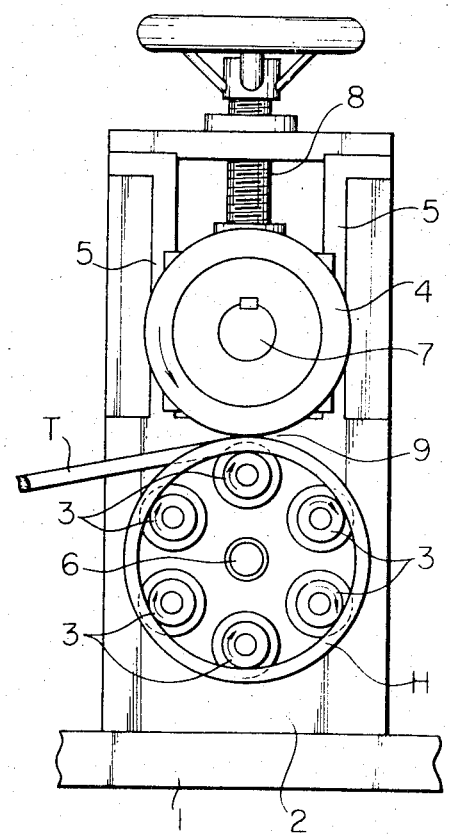
FIG. 4 is a front view of the apparatus of FIG. 3.
Figure 3:
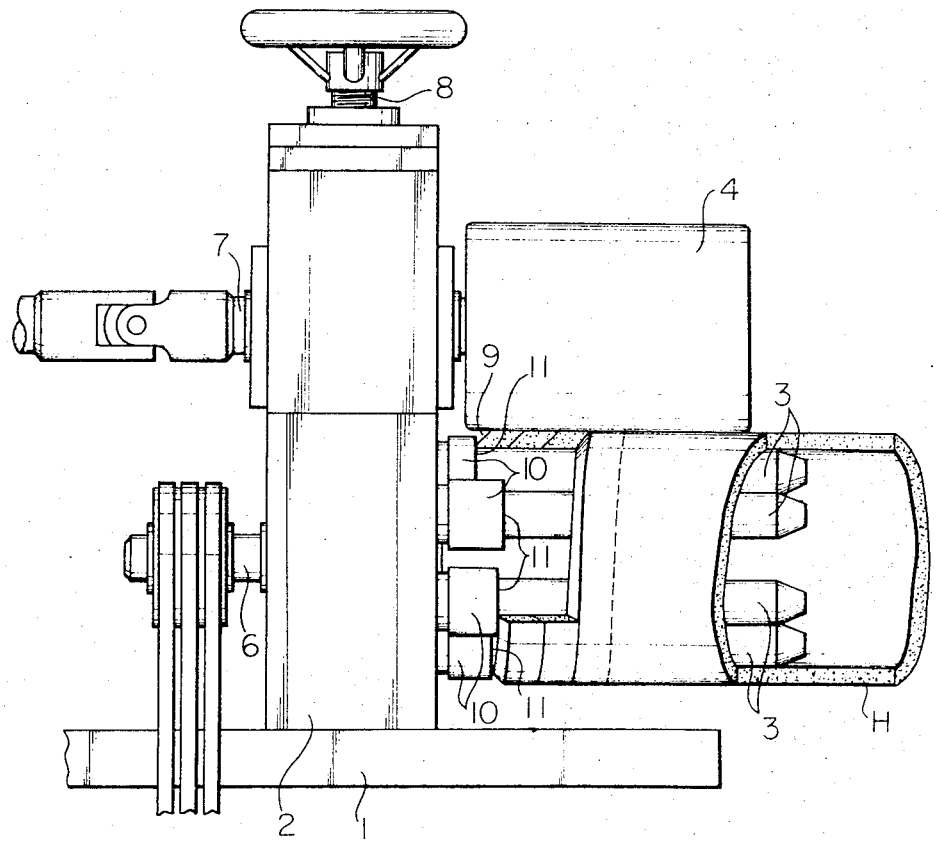
FIG. 3 is a partly cross-sectional side view of the apparatus according to another embodiment of the present invention, showing in cross-section the tape material as it starts to be entrained on the shaping rolls and the resultant hose as it leaves the apparatus.

Turning to FIGS. 3 and 4, there is shown another embodiment of the present invention, in which like parts are indicated by like numerals used in FIGS. 1 and 2. This alternative embodiment differs from the above-described one in that enlarged annular portions 10 are formed on the respective shaping rolls 3 at the rear end thereof in such a manner that these enlarged annular portions form stepped portions 11 as shown in FIG. 3. These stepped portions 11 are arranged so that they are gradually increased in axial length in the clockwise direction, as viewed in FIG. 4, that is, from the uppermost shaping roll 3 forming the feed port for the tape T to the successive shaping rolls 3. The increment in the axial length of each stepped portion 11 is one-sixth of the width of the tape T.

In operation, the soft tape T of vinyl chloride, or the soft tape T of vinyl chloride enclosing a harder synthetic resin core extruded from an extruder is charged along the first stepped portion 11 into the gap 9 between the uppermost shaping roll 3 and the pressing roll 4, as shown in FIG. 4. The tape T thus charged is then moved by the rotating rolls 3 and 4 so as to be entrained on the successive stepped portions 11 in the clockwise direction as viewed in FIG. 4, so that the tape T moves forward a distance corresponding to a pitch of the spiral turn while making a full rotation around the shaping rolls 3. In this way the tape T moves forward while moving spirally around the shaping rolls 3. During such movement of the tape T the shaft 8 may be manually operated for the suitable adjustment of the gap 9 between the shaping and pressing rolls 3 and 4, and thus the adjacent edges of the spirally moving tape T are closely joined together to form a continuous, integral hose H in the manner described with respect to the previous embodiment.

With such an arrangement, the tape or the hose resulting therefrom can be guided very smoothly out of the apparatus without the provision of any special guide means such as sloped grooves in the pressing and shaping rolls and each of these rolls may have a smooth wall surface which is easy and economical to form.

What is claimed is:

1. An apparatus for continuously making a hose comprising a plurality of cantilever type shaping rolls disposed so as to form an imaginary cylindrical surface and driven for rotation at an equal velocity in the same direction, said shaping rolls being adapted to carry thereon a soft synthetic resin tape, or a soft synthetic resin tape enclosing a harder synthetic resin core and having tacky edges in such a manner that the tape is spirally entrained on said shaping rolls and moved forward from the rear end to the fore end of the rolls, and a pressing roll disposed outwardly of and parallel with said shaping rolls and having a cylindrical surface spaced from and in opposed relationship with one of said shaping rolls, said pressing roll pressing said spirally moving tape so as to join the adjacent edges thereof with each other in succession to thereby form the tape into an integral hose which is discharged out of said fore end of said shaping rolls, said pressing roll having an enlarged annular portion formed at the rear end thereof with a right cylindrical peripheral surface and a frusto-conical tape guiding surface extending between the peripheral surface of said enlarged annular portion and the peripheral surface of said pressing roll.

2. An apparatus for continuously making a hose comprising a plurality of cantilever type shaping rolls disposed so as to form an imaginary cylindrical surface and driven for rotation at an equal velocity in the same direction, said shaping rolls being adapted to carry thereon a soft synthetic resin tape, or a soft synthetic resin tape enclosing a harder synthetic resin core and having tacky edges in such a manner that the tape is spirally entrained on said shaping rolls and moved forward from the rear end to the fore end of the rolls, and a pressing roll disposed outwardly of and parallel with said shaping rolls and having a cylindrical surface spaced from and in opposed relationship with one of said shaping rolls, said pressing roll pressing said spirally moving tape so as to join the adjacent edges thereof with each other in succession to thereby form the tape into an integral hose which is discharged out of said fore end of said shaping rolls, said shaping rolls each having an enlarged cylindrical portion at the rear end thereof, said enlarged portions having axial dimensions increasing in succession around the shaping rolls in the direction in which said tape is spirally entrained, the end surfaces of said enlarged portions facing toward the free ends of said shaping rolls forming stepped portions extending toward said free ends of the shaping rolls and for pressing the tape edges, the axial length of each stepped portion increasing by an amount corresponding to the width of the tape by the number of the shaping rolls.

* * * * *